(12) United States Patent
Moag (10) Patent No.: US 10,220,299 B2
(45) Date of Patent: Mar. 5, 2019

(54) TRAINING SYSTEMS AND METHODS (71) Applicant: ThinAir Gaming LLC, Winnetka, IL (US)

(72) Inventor: Christopher Moag, Winnetka, IL (US)

(73) Assignee: ThinAir Gaming LLC, Winnetka, IL (US)

( * ) Notice: Subject to any disclaimer, the term of this patent is extended or adjusted under 35 U.S.C. 154(b) by 152 days.

(21) Appl. No.: 15/258,071

(22) Filed: Sep. 7, 2016

(65) Prior Publication Data

US 2018/0065032 A1    Mar. 8, 2018

(51) Int. Cl.
| | | |
|---|---|---|
| A63F 3/00 | (2006.01) | |
| A63F 9/00 | (2006.01) | |
| A63F 1/00 | (2006.01) | |
| A63F 3/04 | (2006.01) | |
| G09B 19/00 | (2006.01) | |
| G09B 19/22 | (2006.01) | |
| G09B 17/00 | (2006.01) | |

(52) U.S. Cl.
CPC .......... *A63F 3/0421* (2013.01); *A63F 3/0423* (2013.01); *G09B 19/00* (2013.01); *G09B 19/22* (2013.01); *A63F 1/00* (2013.01); *A63F 3/00* (2013.01); *A63F 9/00* (2013.01); *A63F 2003/0426* (2013.01); *G09B 17/003* (2013.01)

(58) Field of Classification Search
CPC ....................................................... A63F 3/04
See application file for complete search history.

(56) References Cited

U.S. PATENT DOCUMENTS

| | | | |
|---|---|---|---|
| 4,190,255 A | | 2/1980 | Hughes |
| 4,896,889 A | * | 1/1990 | Kuhn ........................ A63F 1/10 |
| | | | 273/150 |
| 2005/0059470 A1 | | 3/2005 | Cannon |
| 2006/0022407 A1 | * | 2/2006 | Jensen ...................... A63F 3/04 |
| | | | 273/272 |

(Continued)

FOREIGN PATENT DOCUMENTS

WO    2016042490 A1    3/2016

OTHER PUBLICATIONS

Nov. 6, 2017—International Search Report and Written Opinion—PCT/US17/50009.

(Continued)

*Primary Examiner* — James S McClellan
*Assistant Examiner* — Syvila Weatherford
(74) *Attorney, Agent, or Firm* — Banner & Witcoff, Ltd.

(57) ABSTRACT

A field of play may include linearly arranged locations in which a game piece, e.g., representative of a letter, may be played, in an attempt to form words. An example field of play includes a 5×5 grid formed of squares. Each playable location in the field of play is randomly assigned a unique integer number from 1-n, where n is the total number of playable locations. Each of two or more players use identically shaped fields of play, but having different randomly assigned numbers. Players take turns placing letters in their field of play to form words and, as they do so, the same letter is automatically placed into all opponent's fields of play at the same numbered location, thereby obstructing the opponent's progress in forming his own words in his own field of play. Scoring may be based on the number and length of words formed by each player.

14 Claims, 7 Drawing Sheets

(56) References Cited

U.S. PATENT DOCUMENTS

| | | | |
|---|---|---|---|
| 2008/0265508 A1* | 10/2008 | Benedict | A63F 3/0423 |
| | | | 273/272 |
| 2009/0066022 A1 | 3/2009 | Yu | |
| 2013/0099446 A1* | 4/2013 | Benedict, III | A63F 3/0023 |
| | | | 273/242 |
| 2014/0175745 A1 | 6/2014 | Noval | |
| 2015/0190708 A1* | 7/2015 | Hoyt | A63F 3/0421 |
| | | | 463/9 |

OTHER PUBLICATIONS

Admitted Prior Art: "Scrabble Rules" by Hasbro Gaming; Accessed Dec. 21, 2016; http://scrabble.hasbro.com/en-us-rules.
Admitted Prior Art: "Battleship" by Hasbro Games; Accessed Dec. 21, 2016; http://www.hasbro.com/en-us/product/battleship:2560F81B-5056-9047-F55A-F26A61C519C3.

* cited by examiner

| 303a  | 303b  | 303c  | 303d  | 303e  |
|   4   |  10   |  15   |   2   |  19   |
| 303f  | 303g  | 303h  | 303i  | 303j  |
|  14   |   6   |   9   |  18   |  11   |
| 303k  | 303l  | 303m  | 303n  | 303o  |
|  20   |   1   |  23   |  16   |  22   |
| 303p  | 303q  | 303r  | 303s  | 303t  |
|   5   |  25   |  12   |   3   |  24   |
| 303u  | 303v  | 303w  | 303x  | 303y  |
|  17   |   8   |  21   |   7   |  13   |

TRAINING SYSTEMS AND METHODS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Aspects described herein generally relate to analytical training systems and methods. More specifically, aspects provide new physical, virtual, and/or electronic boards, pieces, mechanics, heuristics, rules, techniques, methods, and systems involving logic, spelling, visualization, and movement of letters or other characters to form words or other discrete linear constructs.

BACKGROUND

Puzzles not only provide entertainment, but also serve as teaching tools and educational devices. Logic puzzles, and word puzzles in particular, help educate and improve one's spelling, analysis, problem solving skills, reading comprehension, reasoning, and general knowledge. New and innovative techniques are difficult to create, and are in constant demand.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to new and unique puzzle mechanics, systems, and methods. As a brief introduction, and without limitation, a field of play for a game may include linearly arranged locations in which a game piece, e.g., representative of a letter, may be played, in an attempt to form words. An example field of play includes a 5×5 grid formed of squares. Each playable location in the field of play may be randomly assigned a unique integer number from 1-n, where n is the total number of playable locations. Each of two or more players use identically shaped/sized fields of play, but having different randomly assigned numbers. Players take turns placing letters into their field of play to form words and, as they do, the same letter is automatically placed into all opponent's fields of play at the same numbered location, thereby obstructing the opponent's progress in forming words in his or her own field of play.

According to a first aspect, a method of play may include identifying, for each of a plurality of players, a common field of play comprising a plurality of linearly arranged playable locations along a plurality of different linear paths (e.g., a 5×5 grid of rectangles, although triangles and hexagons may alternatively be used). For a first player, a unique identifier may be assigned for each playable location within the first player's field of play, where each identifier is selected from a set of identifiers (e.g., integers from 1-n) to create a one-to-one correspondence between each playable location in the first player's field of play and each identifier in the set of identifiers. For a second player, a unique identifier may be assigned for each playable location within the second player's field of play, where each identifier is selected from the set of identifiers to create a one-to-one correspondence between each playable location in the second player's field of play and each identifier in the set of identifiers, and where at least of plurality of playable locations in the common field of play have different unique identifiers for the first and second players. Game play proceeds with each player iteratively indicating a piece to be played at a particular open playable location in that player's field of play, and placing, for each piece played by one player, the same piece in the playable location having the same unique identifier on the field of play of each of the one or more other players. Play continues iteratively until all playable locations have been filled.

In some variations, e.g., where a field of play has an odd number of playable locations, play is iterative until all but one playable location has been filled on each field of play, and then each player places a last piece on that player's field of play.

In some aspects, each piece represents a letter of an alphabet.

A score may be calculated corresponding to each player based at least in part on a number of words formed on each player's field of play, and based at least in part on a length of the words formed on each player's field of play.

The method may be played using a physical board game embodiment, or implemented on a special purpose computer system configured as described herein.

These and other variations are described in more detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the drawings, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. For example, one or more aspects may be embodied in a physical device or puzzle, or may be implemented as a video game, software, or via a virtual reality or augmented reality device.

Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As a brief introduction before discussing various aspects in more detail, new methods and systems for analytic training systems are described herein. Such analytic training systems help individuals develop logic and analytical skills, as well as spelling, problem solving, and critical thinking skills. In brief summary, a user (also referred to as a player) may be assigned a game board (also referred to as the field of play) comprising a square 5×5 grid of playable locations. Each playable location may be randomly numbered from 1-25, such that each location has a unique integer number. A second player (e.g., another person or a computer-controlled player) is assigned a second field of play with different random number assignments. Players take turns placing letters in any open location on their own field of play. When they do so, the same letter is automatically placed on the same location number on the other player's field of play (which may be located in a different position on the second player's field of play than it is on the first player's field of play). Each player attempts to spell as many words as possible, either vertically, horizontally, and/or diagonally, in view of the opponent's letters also being placed in the field of play. Scoring may be based on the length of the words spelled by each player, and the player with the highest score wins. These and other aspects are described in more detail below.

Figure 1:
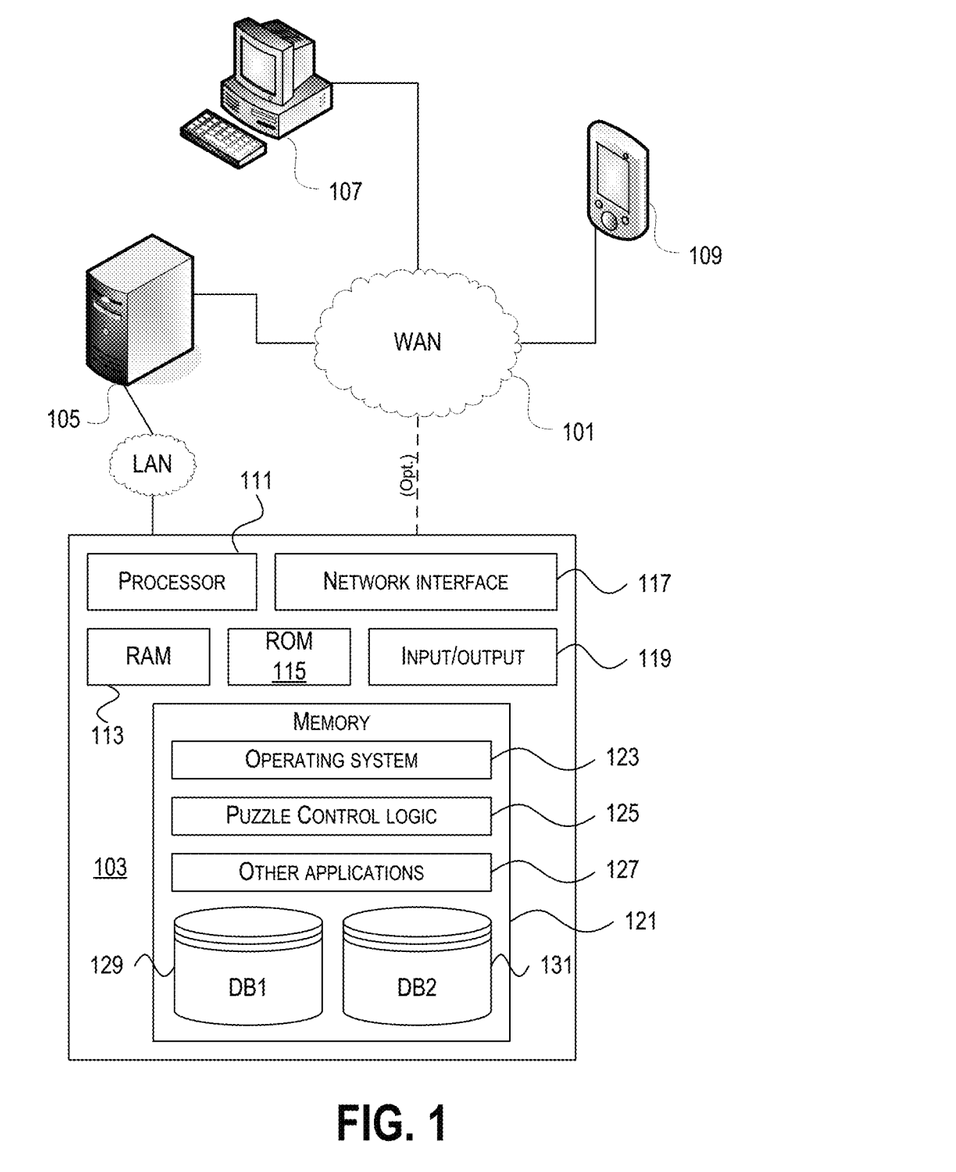
FIG. 1 illustrates one example of a network architecture and data processing device that may be used to implement one or more illustrative aspects described herein.

FIG. 1 illustrates one example of a computer and network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 (e.g., a word dictionary) and a second database 131 (e.g., to track user/game status, friends lists, ongoing games, statistics, difficulty levels, etc.). In some embodiments, the first database may include the second database (e.g., as a separate table, report, subsystem, etc.). That is, the information can be stored in a single database, or separated into different logical, virtual, or physical databases, depending on system design. Additional databases may also be used as needed. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
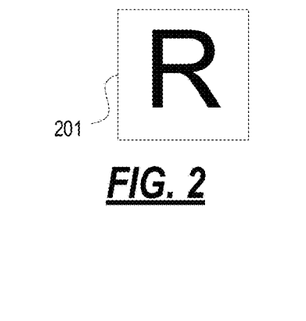
FIG. 2 illustrates a sample unit of play according to one or more illustrative aspects described herein.

As introduced above, one or more aspects described herein provide a training or educational tool for improving one's logic, reasoning, spelling, spatial visualization, object orientation, general knowledge, intelligence, reading comprehension, and/or analytical skills and abilities. Initial illustrative aspects are described as may be embodied in a word game. With reference to FIG. 2, each game "piece" 201 may display a single letter, and is preferably of uniform shape.

Figure 3:
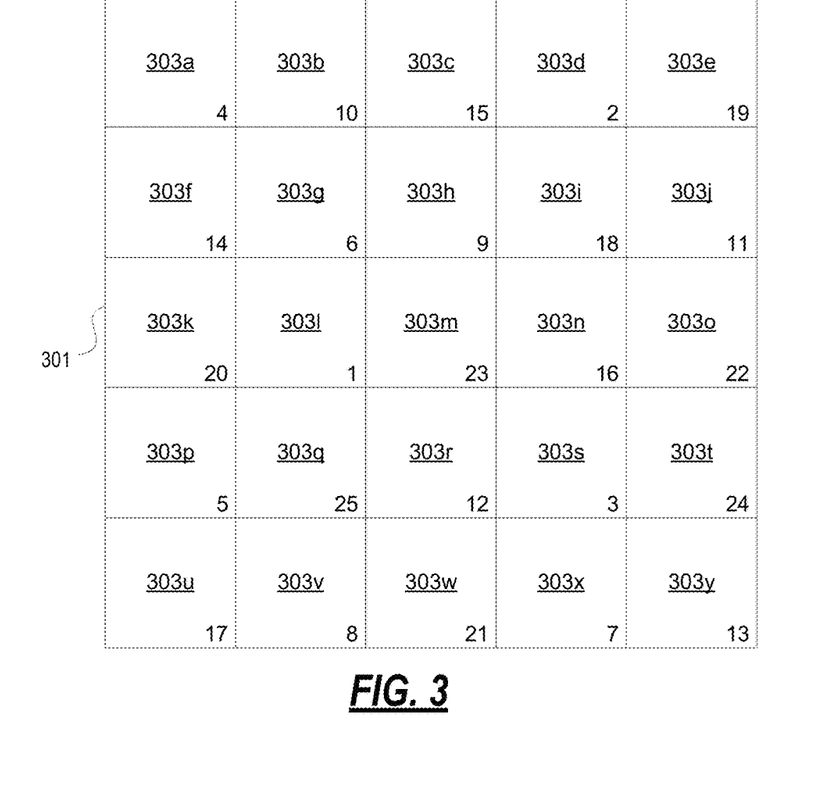
FIG. 3 illustrates a sample field of play according to one or more illustrative aspects described herein.

With further reference to FIG. 3, a field of play 301 may comprise a 5×5 grid of playable locations 303a-303y. Other size fields of play may also be used, and the field of play also need not be square. Rather, any field of play may be used provided there are linearly arranged playing locations in which pieces may be played to form words. For example, the size of the field of play 301 may vary based on a difficulty level, or adjusted in shape to fit a shape of a display screen. In some embodiments the field of play may be 4×4, 5×5, 6×6, 4×6, 5×7, or any desired size. As shown in FIG. 3, each location 303 on field of play 301 may be randomly numbered from 1 to n (where n is the total number of playable locations), such that each location is assigned a unique integer number. The assigned numbers preferably change from one game to the next, or from one field of play to the next, and also may differ among all players competing against each other in the same game.

Figure 4:
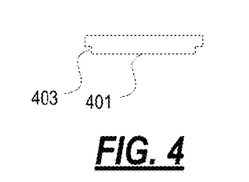
FIG. 4 illustrates a profile of a sample tile according to one or more illustrative aspects described herein.
Figure 5:
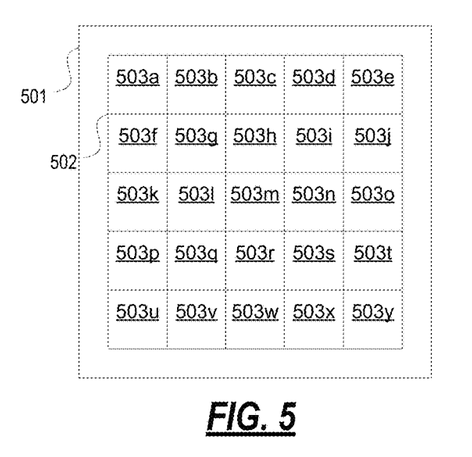
FIG. 5 illustrates a sample playing board according to one or more illustrative aspects described herein.

FIG. 4 shows a side profile view of a physical tile 401, which displays on its top face (not shown) one piece (e.g., one letter). FIG. 5 illustrates a physical game board 501 which may be used to place tiles 401. Game board 501 may include vertical and horizontal dividers 502 forming playable locations 503a-503y. One wall/divider 502 is labeled for illustration only. Each tile 401 may have one or more indentations 403 around its base periphery to fit securely within the locations 503a-y of game board 501 formed by dividers 502.

Figure 6:
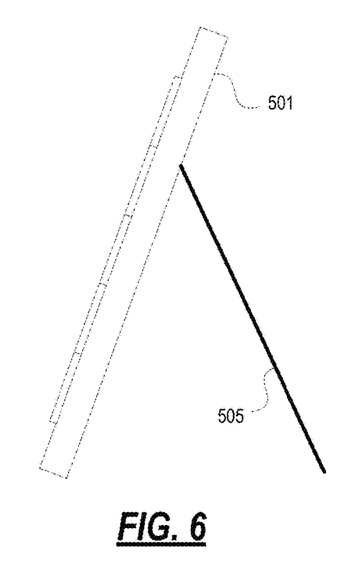
FIG. 6 illustrates a side view of the sample playing board, with kickstand extended, according to one or more illustrative aspects described herein.
Figure 7:
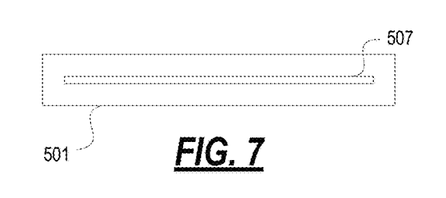
FIG. 7 illustrates a top view of a sample playing board according to one or more illustrative aspects described herein.

Game board 501 may be used in an upright position to shield one player's field of play from other players, as shown in FIG. 6. Game board 501 may include a kickstand 505 to support upright play. In order to define or identify the random numbers assigned to each location 503a-503y on game board 501, preprinted cards may be placed in a slot opening 507, as shown in FIG. 7, thereby causing the preprinted card to be slid down and displayed underneath each playable location. Each preprinted card may have a different random assignment of numbers from 1-n, e.g., as shown in FIG. 3. Alternatively, game pieces/tiles may be played directly on preprinted cards. A physical board game version of the game may include a wide variety of preprinted cards to provide a pseudo random experience for players, e.g., 25 cards, 50 cards, 75 cards, or any desired number of preprinted cards. Blank cards may also be used, whereby users can write in their own numbers 1-n for playable locations.

Numbering of playable locations from 1-n is merely one variant. In other variants, letters, symbols, images, or colors may be used to identify each playable location. For example, pictures of dogs, cats, shapes, famous people, personal photos, and the like may be used to identify each playable location in other variants. So if a player plays the letter 'R' on a playable location having a German shepherd image on it, then an 'R' would also be placed on the opponent's field of play in the location having a German shepherd. In still other variants, an intermediate layer of abstraction may be used so that different users may use different images corresponding to locations numbered 1-25, e.g., one user might use all dogs, and the other user all cats, each corresponding to a location 1-n as described herein.

Figure 8:
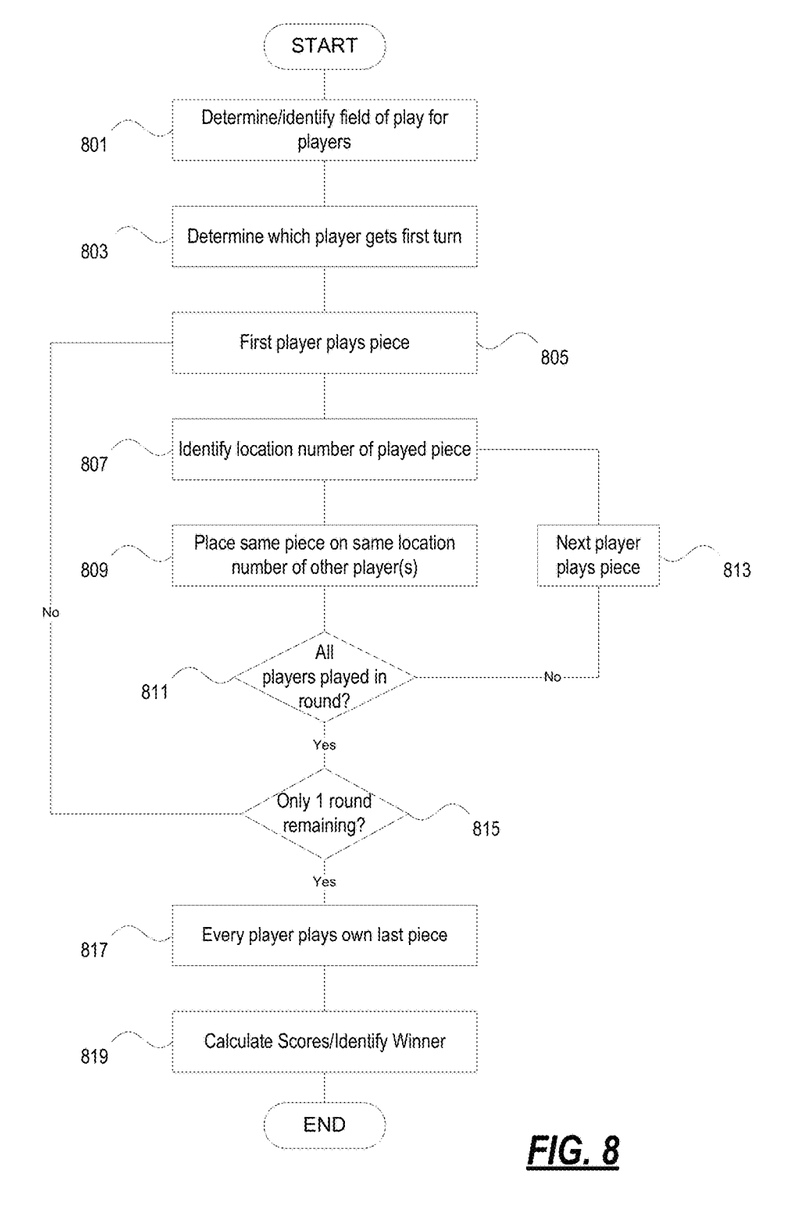
FIG. 8 illustrates a training method according to one or more illustrative aspects described herein.
Figure 9:
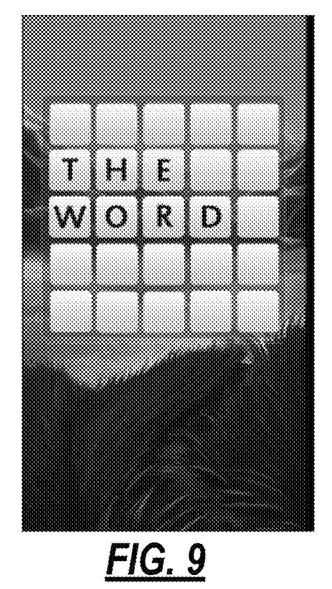
FIG. 9-18 illustrate screenshots showing a computer-implemented training method according to one or more illustrative aspects described herein.
Figure 10:
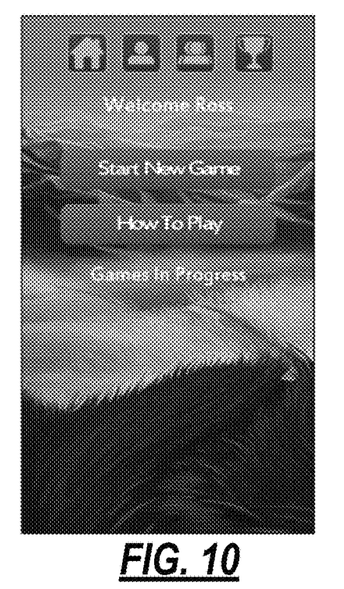
Figure 11:
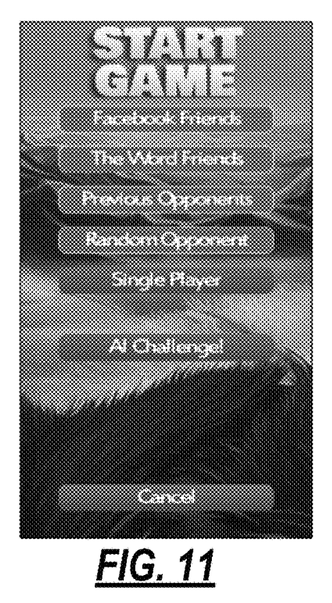
Figure 12:
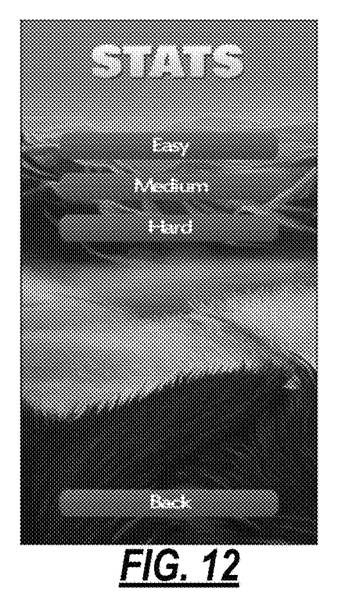

FIG. 8 shows a method of game play according to one or more illustrative aspects. Purely for illustration, a 5×5 field of grid with playable locations uniquely numbered from 1-25 is used. Further reference will be made to FIG. 9-18 showing screenshots of an illustrative computerized embodiment. FIG. 9 illustrates a title/welcome screen. FIG. 10 illustrates a first menu screen. FIG. 11 illustrates a Start Game menu screen. FIG. 12 illustrates a difficulty selection screen when an artificial intelligence (AI) opponent is selected. In the present example, upon selection of the difficulty level for an AI opponent, game play may begin.

Figure 13:
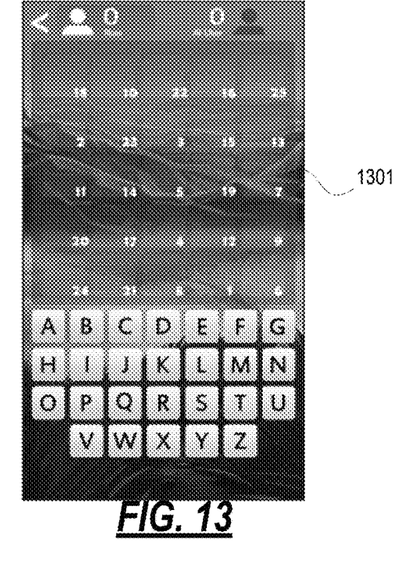

Initially, in step 801, each player competing in a game determines, identifies, or is assigned a field play having a particular random arrangement of playable locations numbered from 1-25. FIG. 13 illustrates a field of play 1301 assigned to or generated for a user of a device, e.g., device 109. Each user/player competing against each other in the same game is preferably assigned different fields of play. However, the same field of play may be used for all players in some embodiments. Random numbering of playable locations is one variant. In other variants, users themselves may touch playable locations in any random order to establish their own numbering of playable locations, which could form part of the strategy of the game. Or each user could select a starting playable location and the game might number the playable locations for that from 1-n starting at the selected location of each player.

Game controller logic or software 125 may control operations as described herein. Next, in step 803, game controller 125 may determine which player goes first, e.g., randomly or alternating between human and AI. In other examples, when two humans are competing, a starting player may be randomly determined, but when one player is an AI player, then the human might always go first. Any determination algorithm may be used, e.g., whoever's birthday is next goes first.

Figure 14:
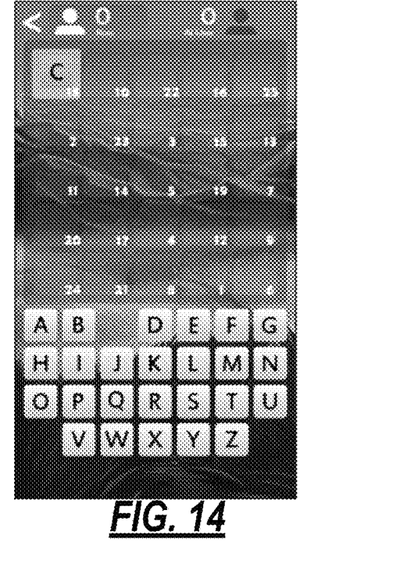

Once the starting player is determined, then in step 805 the first player plays a piece in any open (unused) playable location on his or her own field of play, e.g., as shown in FIG. 14 where the player has played the letter "C" in the location assigned number 18. As shown in FIGS. 13 and 14, it is player "Ross" turn as illustrated by the shading over Ross' information at the top left of the screen. After the first player plays, then in step 807 game controller 125 identifies the location number the player used (here, 18) and then in step 809 the game controller 125 places the same letter (here, "C") in the same randomly numbered location on all other player's fields of play. In this example, the letter "C" is placed on the AI player's field of play in the location numbered 18, wherever that location happens to be (not shown).

Figure 15:
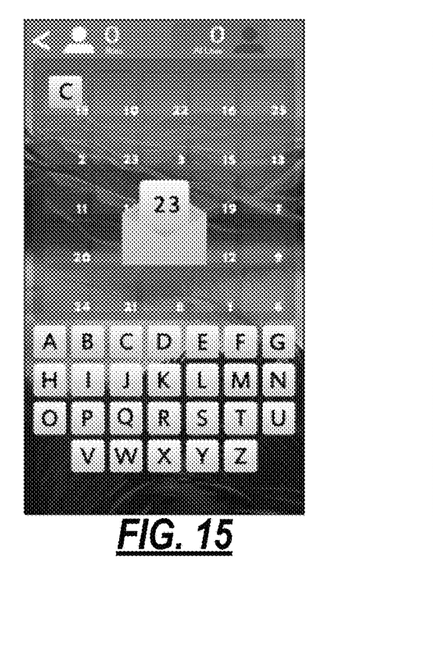
Figure 16:
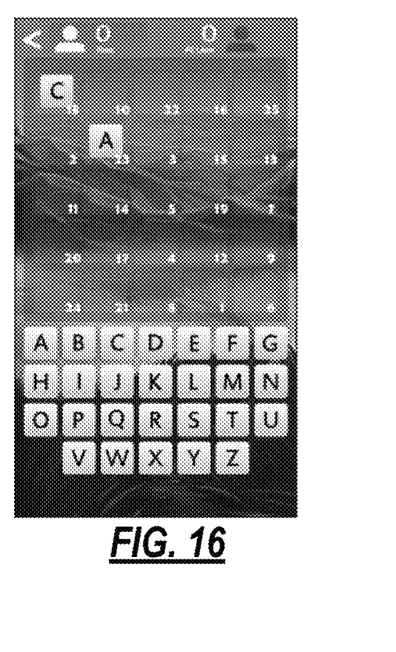

In step 811 the game controller 125 determines whether all players have placed a piece in this round and, if not, proceeds to step 813 where the AI player chooses a piece to play. In step 807, as shown in FIG. 15, the AI player placed a piece in its location numbered 23 (it is the AI's turn, as shown by the shading over the "AI User" in FIG. 15). In step 809, as shown in FIG. 16, game controller 125 places the played piece ("A") in location 23 of the player's field of play 1301. In this second iteration of step 811, all players will have been determined to have played in this round (there being only two players in this example), and game controller then proceeds to step 815. In step 815 game controller 125 determines whether only one round remains. If no, then game controller returns to step 805 to iterate through steps 805-813 until only one round remains.

In step 815, when only 1 round remains, game controller 125 proceeds to step 817 where every played chooses the last piece placed in the last remaining open position on his or her own field of play. In this manner, each player can try to maximize their score by placing a last piece that might form a word in combination with the already placed pieces/letters. Lastly, in step 819, when all fields of play are full each player's score is totaled, and a winner is determined. Alternatively to step 817, all rounds might be played using steps 805-815 (e.g., when there are an even number of playable locations on the field of play), then game controller 125 may proceed directly to step 819 from step 815' (not shown, but where a determination is made whether any rounds remain).

Figure 17:
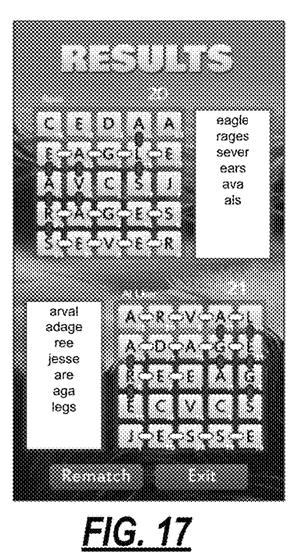
Figure 18:
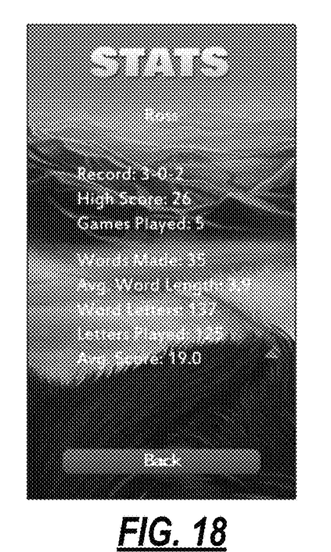

FIG. 17 shows a game results screen that identifies words formed by each player, as well as a final score, from which a player may play again, or return to a higher level menu. FIG. 18 illustrates a statistics screen, providing useful information to the user about games played, win record, words formed, and the like.

The above represents merely an illustrative embodiment. Many variations may be made without departing from the spirit and scope described herein. For example, as discussed above, the size and shape of the field of play may vary in some embodiments. Also, in one embodiment each player can place any letter of the alphabet during each turn. However, in other embodiments, the number of times that a letter may be used may be limited or constrained. In one embodiment each letter might only be able to be used by each player a maximum number of times, whereas in another embodiment each letter might only be able to be used by all players combined a maximum number of times during a game. In some variations, words might only be permitted or scored when formed horizontally and vertically, reading only from left to right and top to bottom. In other variations, words might be allowed to read in any direction, and/or along major and/or minor diagonals within the field of play as well as horizontally and vertically.

As discussed above, different fields of play may be used by each player. However, in one variation the same random field of play might be provided to two players competing against an AI opponent, to see which can get a higher score under similar match conditions. That is, the two players may each compete against an AI opponent, using the same field of play, to see who can get the highest score. The AI opponent may also use a consistent field of play against each of the challengers.

Figure 19:
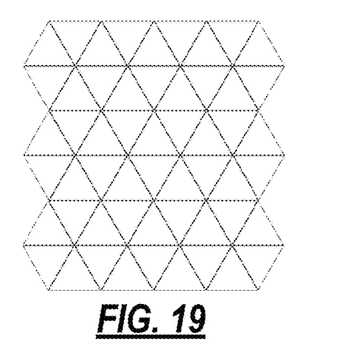
FIG. 19-20 illustrates alternative playing field shapes and arrangements according to one or more illustrative aspects described herein.
Figure 20:
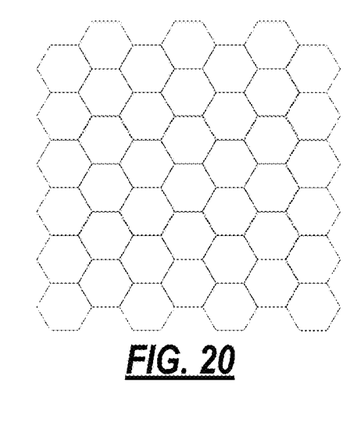

The above aspects have thus far been described with respect to square shaped pieces. However, pieces (and thus the field of play) may be based on shapes other than squares. For example, triangles and hexagons may also be used. A combination of shapes may be used as well, provided they may be arranged with linear locations to play words. For example, FIG. 19 illustrates a field of play using triangular shaped pieces, and where words may be formed horizontally, vertically, and/or along any desired diagonal (e.g., all diagonals, diagonals greater than length x, etc.). FIG. 20 illustrates a field of play using hexagon shaped pieces, where words may be formed only vertically or diagonally. By rotating the field of play in FIG. 20 by 90-degrees, words may instead be formed horizontally or diagonally.

As described thus far, the Roman/Latin alphabet and English dictionary have been used. However, any desired alphabet may be combined with any suitable dictionary. For example, Cyrillic, Greek, Chinese, Korean, Japanese, or other alphabets may be used. In addition, a dictionary might include all words in a given language, or may be limited to a desired subject matter (e.g., travel, geography, sports, lifestyle, celebrities, movies/TV, science, etc.). Aspects described herein may be used with any set of discrete characters, symbols, images, etc., that can be formed into larger linear or even planar constructs.

In addition, different players may use different alphabets. For example, an English language speaker might play against a French speaker, both using the same alphabet, but each being judged based on a dictionary in their own language. In yet other embodiments, players might even use different alphabets, and letters might be converted from one alphabet to another using predefined heuristics, e.g., using phonetics.

In yet another example, each player may be assigned a color, e.g., red or blue. One player may attempt to play as many contiguous red pieces as possible, while the other player is trying to play as many contiguous blue pieces as possible. Their respective moves will have the natural effect of blocking the other player's ability to continue playing contiguous pieces. The player with the largest contiguous block may win, or the player with the least "island" or solitary pieces may win.

Discussed briefly above, scoring may be based on the length of words formed. In one illustrative example, using a 5×5 square field of play, each player may receive 1 point for each 3-letter word formed, 3 points for each 4-letter word formed, and 5 points for each 5-letter word formed. According to another variation, pieces played by each player may be distinguishable by color of font of the letter depicted on each piece. For example, pieces played by one player may have blue letters, and the pieces played by a second player may have red letters. Each player may get bonus points for words formed using pieces placed by the other player, e.g., 1 extra point each time a piece placed by an opponent is used to form a word. Alternatively, 1 bonus point might awarded when 1 piece placed by an opponent is used in a word, 3 bonus points might be awarded when 2 pieces placed by an opponent are used within the same word, and 5 bonus points might be awarded when 3 or more pieces placed by an opponent are used within the same word. In yet another variation, when a word is formed completed by pieces played by an opponent, then the player might receive double the base point value otherwise awardable had the player played all the pieces herself. Alternatively, the opponent might not receive any points, and instead the player receives the points, if pieces played by the opponent form a full word on the player's field of play. In still other variations, more points may be awarded for hard (e.g., less common) words than for easy (common) words, and/or more points may be awarded for using hard letters (e.g., Q, X, Z, etc.) than for using easy letters (e.g., E, S, T, etc.). In another variation, a player may be awarded bonus points if the player forms at least a predefined minimum number of words in a game, or a predefined minimum number of words meeting predefined criteria (e.g., length, commonality/complexity of the words, usage of particular letters, etc.).

Referring back to FIG. 11, in some embodiments one player may play against another player using a different device, e.g., two players each using their respective smartphones, via the "Facebook Friends", "The Word Friends", "Previous Opponents", and/or "Random Opponent" links. In such a scenario, after each turn, the control software may communicate the player's move to either an intermediary server, or directly to an opponent's device. Play continues as described herein as each player takes a turn and the turn information is communicated between devices. Players may also join leagues, ladders, tournaments, and the like, hosted by a sponsor. A ranking system may be used to calculate skills levels of each player, and players may be matched in multi-player matches based on their respective skill levels.

In some embodiments more than two players may compete against each other or against an AI opponent. For example, a game might be played by three players, and each player only gets to directly place a tile every third round. In such a game, one (or two) of the three players may be an AI opponent. Four or more players are also possible.

Other variations may be used as well. For example, in one mode of play, players may be "handicapped" to make play fairer between players of different skill levels (e.g., parent/child). For example, one player may be able to "steal" a predetermined number of turns from the other player, thereby granting that player more tile placements than the other player during a game. In such a mode, the child player may be able to steal 1, 2, 3 or more turns from the parent, or the parent may choose to give a turn to the child. Alternatively, a turn may be taken away from one player and given to another player when a score differential reaches a predetermined level, and the lower scoring player may then choose the next tile placement location.

In another variation of the game, each field of play may have one or more "magic" squares which, after a letter is played on that location, the player may change the letter one or more predefined number of times subsequently during the game. For example, if the magic square has a letter already, and the player has a "swap" remaining, the player may place a new letter on the magic square, and then place the letter that was previously on the magic square in a new unused playable location on the playing field. In some embodiments this may also cause the corresponding letter to change on the opponent's field of play. In other embodiments only the letter played in the new location causes a change to the opponent's field of play. Similarly, in some variations a player may or must use one or more predefined numbers of turns to swap two already placed tiles. In other variations two players may agree to a trade. For example, if Player A wants to change his letter in square 4, and Player B wants to change the letter in square 12, then they can swap letters on their respective fields of play, with or without—this being a design decision—causing other changes based on the new letters being played in a previously played location.

Timers may be used to expedite game play, and scores may be based on how fast a player plays. More points may be awarded for faster play or more quickly formed words. In some variations a player may have the ability to see one or more other player's boards for some limited amount of time, e.g., 1-5 seconds. In other variations, a player may place a blank tile into a field of play, thereby blocking that tile from use in a word on both the player's own field of play as well as on opponents' fields of play.

If a user is having trouble decided where to play a letter, a hint feature may be used. The hint feature may cause the game controller to analyze the player's current field of play, determine a possible word that can be formed, and suggest one or more letters and/or locations in which the player could play a tile to form that word.

A user might have a limited number of "undo" moves, whereby the user can erase a last tile played by the player and/or the opponent. For example, if an opponent plays a particularly bad letter or in a particularly bad location, the player may select "undo," in which case the opponent's last move is erased, and the opponent must choose a new letter to place in a new location.

An in-game chat or message system may be used to communicate taunts between players. In one variation freeform text, pictures, and/or videos may be sent between players. In another variation only predefined messages (canned phrases, taunts, etc.) or emojis/emoticons may be sent between players to avoid cheating or collaboration between players.

When playing against an AI opponent, a "future" or "next" tile to be played by the AI opponent might be displayed for the user to see. The letter may change, based on the player's own next move, but the player at least will know what letter the AI wants to play at that time.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
identifying, for each of a plurality of players, a common field of play comprising a plurality of linearly arranged playable locations along a plurality of different linear paths, wherein each of the plurality of players is associated with a different computing device;
assigning, for the first player, a unique identifier for each playable location within the first player's field of play, wherein each identifier is selected from a set of identifiers to create a one-to-one correspondence between each playable location in the first player's field of play and each identifier in the set of identifiers;
outputting the first player's field of play for display on the computing device associated with the first player;
assigning, for the second player, a unique identifier for each playable location within the second player's field of play, wherein each identifier is selected from the set of identifiers to create a one-to-one correspondence between each playable location in the second player's field of play and each identifier in the set of identifiers, and wherein at least one of the plurality of playable locations in the common field of play have different unique identifiers for the first and second players;
outputting the second player's field of play for display on the computing device associated with the second player;
receiving, iteratively from each player via their respectively associated computing devices, an indication of a piece to be played at a particular open playable location in that player's field of play; and
placing, for each piece played by one player, the same piece in the playable location having the same unique identifier on the field of play displayed on the corresponding computing device of each of the one or more other players.

2. The method of claim 1, wherein receiving is iteratively performed until all playable locations have been filled.

3. The method of claim 1, wherein receiving is iteratively performed until all but one playable location has been filled on each field of play, and the method further comprises each player placing a last piece on that player's field of play.

4. The method of claim 1, wherein the field of play is a 5×5 grid, and wherein the set of identifiers is the set of integers from 1-25.

5. The method of claim 1, wherein each piece represents a letter of an alphabet, and the method further comprising calculating a score corresponding to each player based at least in part on a number of words formed on each player's field of play, and based at least in part on a length of the words formed on each player's field of play.

6. The method of claim 1, further comprising:
depicting all pieces played by the first player in a first color;
depicting all pieces played by the second player in a second color; and
calculating a score corresponding to each player based at least in part on whether one player's pieces are used by the other player.

7. The method of claim 1, wherein each playable location is identically shaped, selected from one of a square, a triangle, or a hexagon.

8. One or more non-transitory computer readable media storing computer readable instructions that, when executed, cause a system to perform:
identifying, for each of a plurality of players, a common field of play comprising a plurality of linearly arranged playable locations along a plurality of different linear paths, wherein each of the plurality of players is associated with a different computing device;
assigning, for the first player, a unique identifier for each playable location within the first player's field of play, wherein each identifier is selected from a set of identifiers to create a one-to-one correspondence between each playable location in the first player's field of play and each identifier in the set of identifiers;
outputting the first player's field of play for display on the computing device associated with the first player;
assigning, for the second player, a unique identifier for each playable location within the second player's field of play, wherein each identifier is selected from the set of identifiers to create a one-to-one correspondence between each playable location in the second player's field of play and each identifier in the set of identifiers, and wherein at least one of the plurality of playable locations in the common field of play have different unique identifiers for the first and second players;
outputting the second player's field of play for display on the computing device associated with the second player;
receiving, iteratively from each player via their respectively associated computing devices, an indication of a piece to be played at a particular open playable location in that player's field of play; and
placing, for each piece played by one player, the same piece in the playable location having the same unique identifier on the field of play displayed on the corresponding computing device of each of the one or more other players.

9. The computer readable media of claim 8, wherein receiving is iteratively performed until all playable locations have been filled.

10. The computer readable media of claim 8, wherein receiving is iteratively performed until all but one playable location has been filled on each field of play, and the method further comprises each player placing a last piece on that player's field of play.

11. The computer readable media of claim 8, wherein the field of play is a 5×5 grid, and wherein the set of identifiers is the set of integers from 1-25.

12. The computer readable media of claim 8, wherein each piece represents a letter of an alphabet, and the method further comprising calculating a score corresponding to each player based at least in part on a number of words formed on each player's field of play, and based at least in part on a length of the words formed on each player's field of play.

13. The computer readable media of claim 8, wherein the computer readable instructions, when executed, further cause the system to perform:
depicting all pieces played by the first player in a first color;
depicting all pieces played by the second player in a second color; and
calculating a score corresponding to each player based at least in part on whether one player's pieces are used by the other player.

14. The computer readable media of claim 8, wherein each playable location is identically shaped, selected from one of a square, a triangle, or a hexagon.

* * * * *